(12) United States Patent
Bernier et al.

(10) Patent No.: US 7,591,136 B2
(45) Date of Patent: Sep. 22, 2009

(54) ANTIROTATION INJECTION SYSTEM FOR TURBOJET

(75) Inventors: Daniel Francis Paul Bernier, Massy (FR); Romain Nicolas Lunel, Brie Comte Robert (FR); Laurent Pierre Elysee Gaston Marnas, Vaux le Penil (FR)

(73) Assignee: SNECMA, Paris (FR)

( * ) Notice: Subject to any disclaimer, the term of this patent is extended or adjusted under 35 U.S.C. 154(b) by 492 days.

(21) Appl. No.: 11/419,841

(22) Filed: May 23, 2006

(65) Prior Publication Data

US 2007/0033950 A1 Feb. 15, 2007

(30) Foreign Application Priority Data

Jun. 7, 2005 (FR) ................................. 05 51518

(51) Int. Cl.
*F23R 3/28* (2006.01)
(52) U.S. Cl. .............................. 60/800; 60/740; 60/748
(58) Field of Classification Search .................. 60/800, 60/748, 740
See application file for complete search history.

(56) References Cited

U.S. PATENT DOCUMENTS

| 4,525,996 | A | * | 7/1985 | Wright et al. ................. 60/748 |
| 4,999,996 | A | * | 3/1991 | Duchene et al. ............... 60/798 |
| 5,117,624 | A | | 6/1992 | Roberts, Jr. et al. |
| 5,117,637 | A | * | 6/1992 | Howell et al. ................. 60/748 |
| 5,222,358 | A | * | 6/1993 | Chaput et al. ................. 60/800 |
| 5,533,330 | A | | 7/1996 | Mullooly et al. |
| 5,916,142 | A | * | 6/1999 | Snyder et al. ................. 60/748 |
| 6,347,508 | B1 | * | 2/2002 | Smallwood et al. ........... 60/800 |
| 2005/0039458 | A1 | * | 2/2005 | Leen et al. .................... 60/748 |

FOREIGN PATENT DOCUMENTS

FR 1547843 11/1968

* cited by examiner

*Primary Examiner*—Ted Kim
(74) *Attorney, Agent, or Firm*—Oblon, Spivak, McClelland, Maier & Neustadt, L.L.P.

(57) ABSTRACT

Injection system of a turbojet engine. It comprises a fixed part and a sliding crossmember. The sliding crossmember comprises a flange capable of sliding on the sliding surface of the fixed part. The fixed part comprises antirotation means and the sliding crossmember of the complementary antirotation means to limit the rotation of the sliding crossmember relative to the fixed part. These means consist of at least one cutout formed in the flange and of at least one lug protruding into said at least one cutout of the flange of the sliding crossmember.

11 Claims, 4 Drawing Sheets

ANTIROTATION INJECTION SYSTEM FOR TURBOJET

BACKGROUND OF THE INVENTION

1. Technical Field

The invention relates to a fuel injection system for a turbojet. More precisely, it relates to an injection system that comprises a fixed part and a sliding crossmember comprising a flange mounted so as to slide on a sliding surface of the fixed part of the injection system, the fixed part comprising antirotation means and the flange of the sliding crossmember comprising complementary antirotation means which interact with those of the fixed part to limit the rotation of the sliding crossmember relative to the fixed part.

2. Description of the Prior Art

Turbojet combustion chambers comprise an inner wall and an outer wall connected at their upstream ends by an annular base to define an annular combustion chamber base. Injection systems evenly distributed over the periphery of the combustion chamber base deliver a mixture of air and fuel that is burnt to provide combustion gases.

An injection system consists of a fixed part which comprises one, and more generally two swirler elements in which the air is rotated, a Venturi and a bowl. The fixed part also comprises a ring comprising a sliding surface. A sliding crossmember comprising a centering part, usually a cone, is designed to center a fuel injector relative to the longitudinal axis of the swirler.

It is known in the prior art to mount the sliding crossmember, sliding relative to the fixed part of the injection system, in order, on the one hand, to accommodate the relative movements of the chamber and the fuel injector due to differential expansions of the various parts forming the engine and, on the other hand, to take account of the manufacturing tolerances. U.S. Pat. No. 5,117,624 describes a sliding crossmember of this type. Furthermore, it is necessary to provide antirotation means in order to prevent rotation of the sliding crossmember relative to the fixed part of the injection system. Specifically, this rotation, when it may occur, causes rapid wear of the parts and considerably reduces their service life. In the device described in the American patent cited hereinabove, these antirotation means consist of a cup having two parallel walls and of a flange of the sliding crossmember comprising two straight faces parallel to sides of the flange. A relatively large clearance is provided between the flange of the sliding crossmember and the straight faces of the cup in order to make it possible, as previously explained, to accommodate the differential expansions and manufacturing tolerances. Nevertheless, the clearance is sufficiently small to prevent a complete rotation of the sliding crossmember relative to the cup of the injection system. However, an antirotation device of this type is difficult to manufacture. It is therefore relatively costly.

SUMMARY OF THE INVENTION

The subject of the present invention is precisely an injection system for a gas turbine engine, particularly for the propulsion of aircraft, which comprises antirotation means that are simple and therefore cheap to produce.

These objectives are achieved according to the invention by the fact that the antirotation means of the flange consist of one or more cutouts formed in the flange and in that the antirotation means of the fixed part consist of one or more lugs protruding into the cutout or cutouts of the flange of the sliding crossmember.

Such a solution is simple to achieve. In addition, the cutout reduces the weight of the sliding crossmember.

In one particular embodiment, the lug or lugs protrude from the sliding surface of the fixed part of the injection system.

In another embodiment, the lug or lugs protrude from a fastening ring which holds the sliding crossmember on the fixed part of the injection system.

The cutout or cutouts may be open or closed.

In yet another embodiment, the flange of the sliding crossmember comprises a first cutout and a second cutout, the first cutout being relatively smaller than the second cutout so that the first cutout limits only the rotation of the sliding crossmember in a first operating step, the second cutout limiting the rotation of the sliding crossmember after a lug protruding into the cutout is worn.

DESCRIPTION OF THE DRAWINGS

Other features and advantages of the invention will appear on reading the following description of exemplary embodiments given for illustration purposes with reference to the appended figures. In these figures.

DESCRIPTION OF THE PREFERRED EMBODIMENTS

Figure 1:
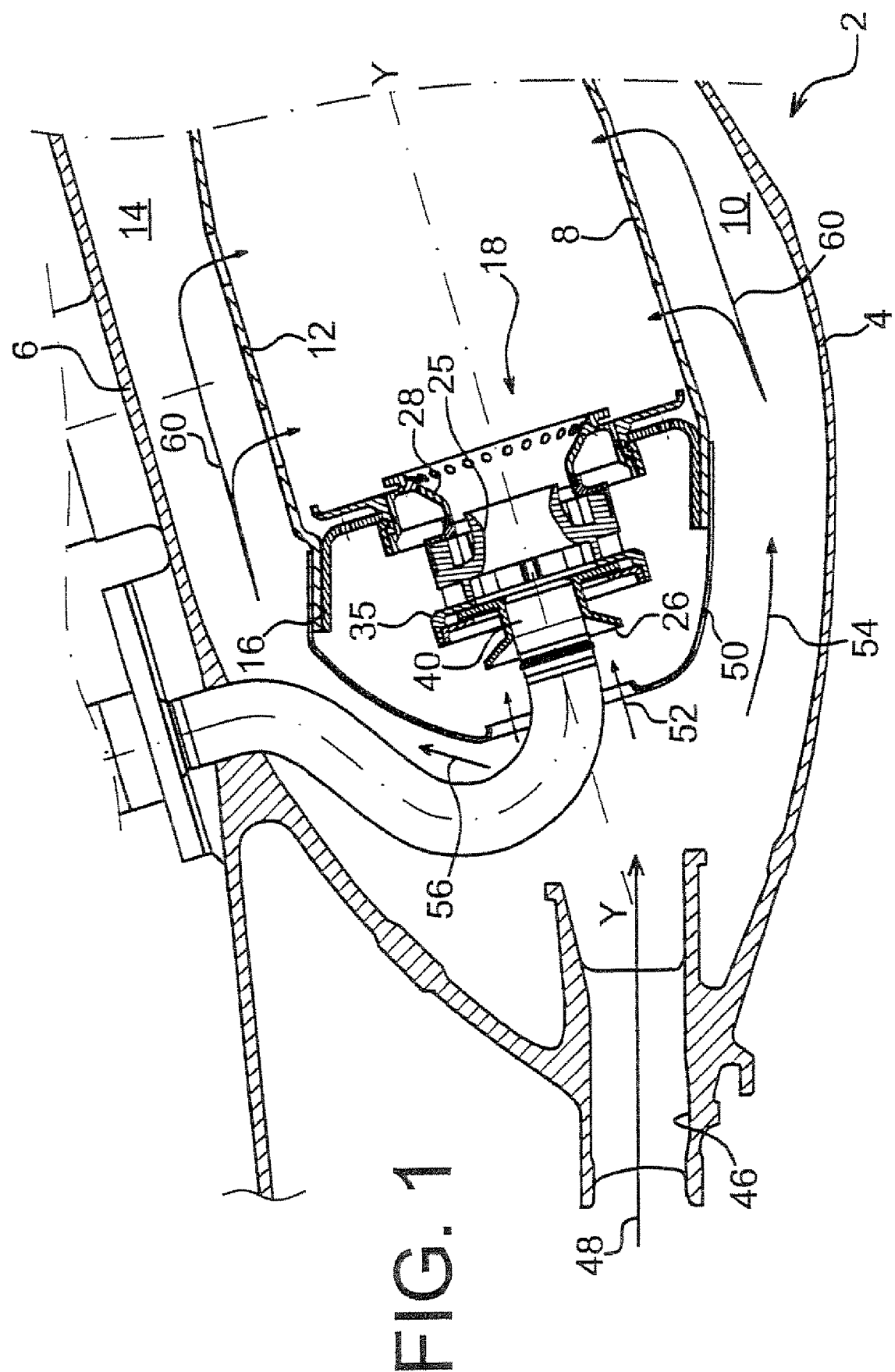
FIG. 1 is an overview in section of a turbojet combustion chamber comprising an injection system according to the present invention.

FIG. 1 shows a partial schematic view, in section, of a turbojet combustion chamber indicated by the general reference number 2 comprising an injection system according to the present invention. The combustion chamber 2 has a shape of longitudinal symmetry of revolution relative to a general axis of the turbine. It comprises an inner casing wall 4 and an outer casing wall 6. An inner chamber wall 8 delimits a passageway 10 with the inner casing wall 4 and an outer chamber wall 12 delimits a passageway 14 with the outer casing wall 6.

Figure 2:
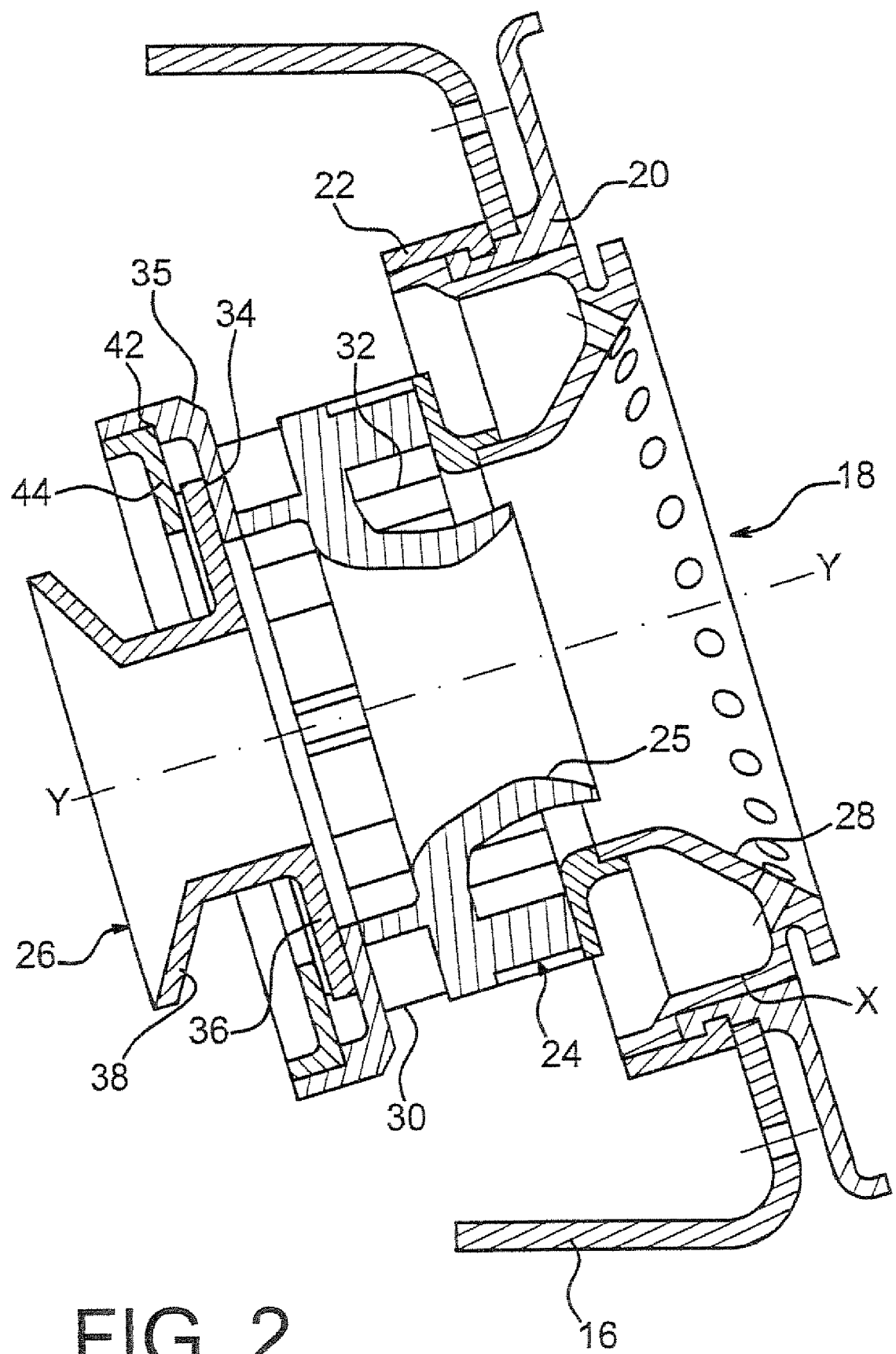
FIG. 2 is a view in section on an enlarged scale of the injection system of FIG. 1.

The inner chamber wall 8 and outer chamber wall 12 are united by a chamber base 16 at their upstream ends. A plurality of injection systems, typically fourteen to twenty-two, evenly spaced angularly (only one injection system has been shown in FIG. 1) are provided on the chamber base 16. As can be seen in greater detail in FIG. 2, each injection system 18 comprises a fixed part consisting of a ring 35 of a swirler element 24, a Venturi 25 and a bowl 28. A sliding crossmember 26 is mounted so as to slide on the ring 35. The swirler element 24 is mounted on a bowl 28 having a flared shape connected to the chamber base 16 by means of a deflector 20 and a split ring 22. The swirler element 24 comprises a first blade stage 30, and a second blade stage 32 whose function is to rotate the air about the longitudinal axis Y-Y of the injection system. The blades of the stages 30 and 32 may be of the same direction or of contrary directions. A sliding surface 34 is provided on the ring 35. The sliding crossmember is mounted so as to slide on the sliding surface of the ring 35. Accordingly, the crossmember 26 comprises a flange 36 capable of sliding on the sliding surface of the ring 34. The sliding crossmember also comprises a centering part, for example a centering cone 38 designed to center a fuel injector 40 (FIG. 1) relative to the injection system 18.

The sliding surface is extended outward by a peripheral rim 42 in order to form a shallow chamber in which the flange 36 is held. The chamber is closed by a cup 44 forming a fastening ring.

A relatively large clearance is provided between the periphery of the flange 36 of the sliding crossmember 26 and the rim 42 situated on the periphery of the ring 34. The purpose of this relatively large clearance is to accommodate the differences of differential expansion that occur between the combustion chamber, raised to a high temperature and the cooler fuel injector. It also makes it possible to accommodate the manufacturing tolerances so that the injector 40 can center itself on the fuel control unit when the combustion chamber is mounted onto the injectors.

The operation of the combustion chamber module is as follows. The pressurized air from the compressor enters the combustion chamber through the passageway 46, as schematized by the arrow 48. A portion of the air passes into the central opening of the fairing 50 as schematized by the arrows 52, while the rest of the airstream is directed via the outside of the fairing 50 to the passageways 10 and 14, as schematized by the arrows 54 and 56. Openings 58 are provided in the inner and outer walls 8 and 12 of the combustion chamber in order to allow the air to enter from the passageways 10 and 14 as schematized by the arrows 60.

The air that enters the fairing 50 is rotated in the stages 30 and 32 of the swirler element and it mixes with the fuel delivered by the injector 40. The gaseous mixture enters the combustion chamber in which it is burned.

In a known manner, the injector system 18 comprises antirotation means to prevent the sliding crossmember from rotating relative to the fixed part of the injector system. Specifically, in the absence of such antirotation means, the sliding crossmember, which must be able to move freely relative to the sliding surface 34, could rotate about the axis Y-Y, particularly under the effect of the vibrations, which results in significant wear and, consequently, in a considerable reduction in the lifetime of the injector and injector spindle system.

Figure 3:
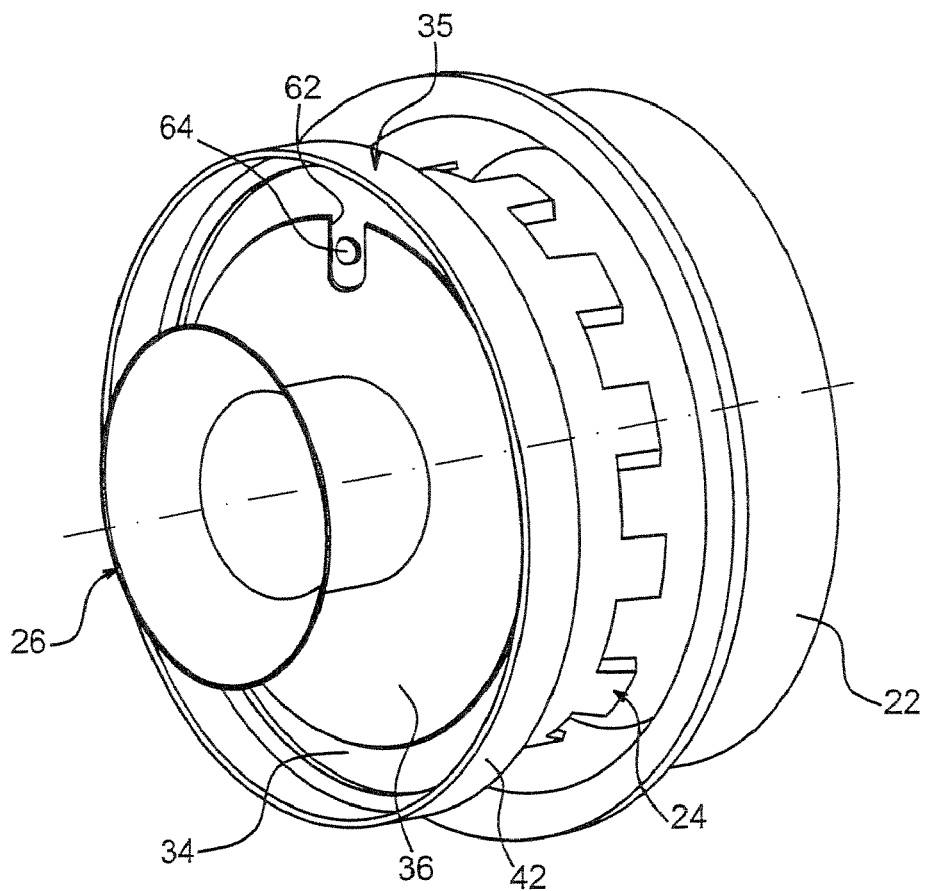
FIG. 3 is a view in perspective of this same injection system.

As can be seen in FIG. 3 which represents a view in perspective of the injection system 18 of the invention, the fastening ring 44 having been removed, the antirotation means consist of a cutout 62 formed in the flange 36 and of a complementary lug 64 formed in the sliding surface 34 of the swirler element. As will also be noted in FIG. 3, a relatively large clearance is provided between the lug 64 and the periphery of the cutout 62 so as not to prevent the movement of the sliding crossmember relative to the sliding surface 34 which allows the clearances and the differential expansions to be accommodated as previously explained. However, the sliding crossmember cannot move relative to the swirler element in such a way that the lug 64 comes out of the opening 62, so that the rotation of the sliding crossmember is prevented. The sliding crossmember may pivot through a certain angle, which is a function of the clearance between the opening 62 and the lug, until the lug butts against the wall of the opening. After that, the rotation of the sliding crossmember is stopped.

As a variant embodiment, the lug or lugs 64 may also be formed from the surface of the fastening ring 44 which faces the flange 36 of the sliding crossmember. Or else, in another variant embodiment, when the flange 36 comprises several cutouts, some of the cutouts may be formed from the sliding surface 34, while others are formed from the fastening ring 44.

Given that the parts that form the fuel control unit of the invention are made of very hard materials, for example special steel, the most advantageous manner of making them is molding. Thus, the lug 64 and the cutout 62 may be obtained directly from founding. However, in a variant embodiment, these parts may also be machined. This is how antirotation means preventing the rotation of the sliding crossmember relative to the ring of the fixed part of the injection system can be produced simply and at low cost.

The cutout may have very varied shapes without departing from the scope of the invention. Thus, as shown in FIG. 4, the lug 64 may have a substantially rectangular shape and the cutout 62 the shape of a sector comprising two flat walls 66 against which the lug 62 presses.

Figure 4:
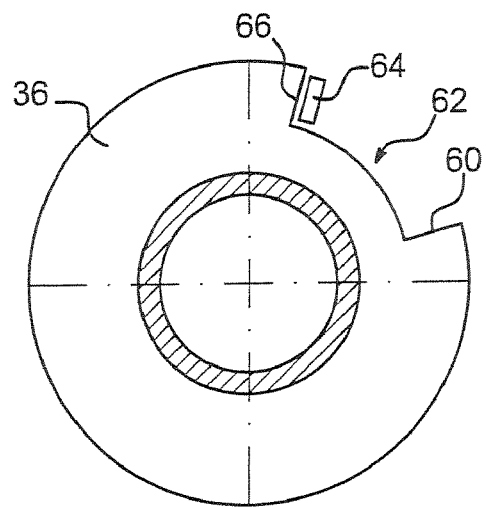
FIGS. 4 to 7 show four different variant embodiments of the antirotation means of an injection system according to the invention.
Figure 5:
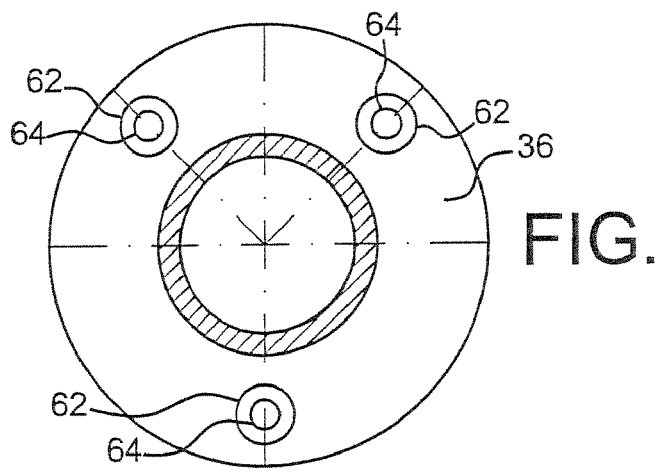

The cutout may be open, as in FIGS. 3 and 4. It may also be closed, as shown in FIG. 5. In this embodiment, the flange 36 comprises three circular perforations 62 forming cutouts and three lugs 64, one lug penetrating the inside of each of the circular orifices 62.

Figure 6:
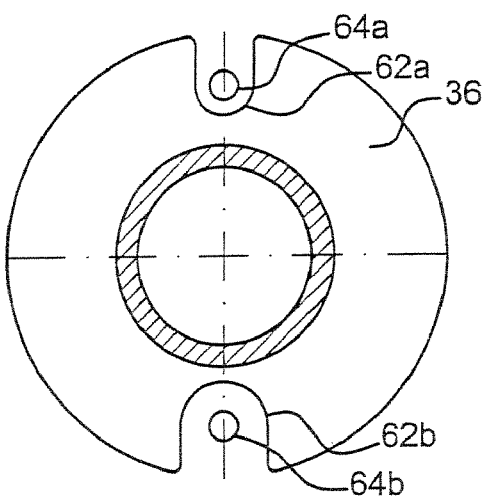

FIG. 6 shows yet another embodiment. The flange 36 comprises a cutout 62*a* and a cutout 62*b*, the cutout 62*a* being relatively smaller than the cutout 62*b*. In this way, it is the lug 64*a*, situated inside the cutout 62*a*, that limits the rotation of the sliding crossmember. Consequently, the lug 64*b*, situated inside the cutout 62*b*, is subject to no wear. If the lug 62*a* breaks due to wear, the lug 64*b* comes into play which doubles the lifetime of the antirotation means.

Figure 7:
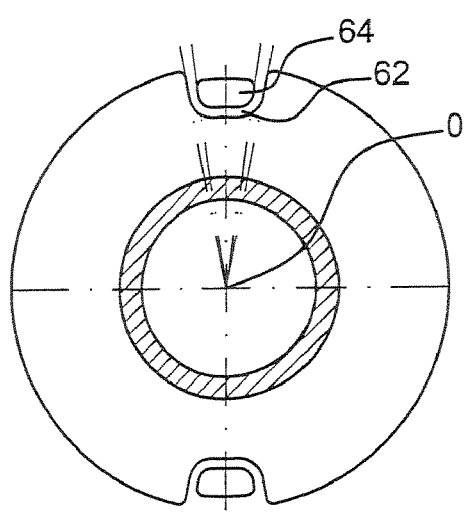

FIG. 7 represents a fourth embodiment. The cutout 62 and the lug 64 have lateral edges whose extension passes through the axis of revolution 0 of the bowl and therefore through the axis of the injector (in operation).

The invention claimed is:

1. A fuel injection system for a turbojet comprising:
   a fixed part including a swirler element configured to receive compressed air and to rotate said compressed air about a longitudinal axis of the fuel injection system, and
   a sliding crossmember comprising a centering part configured to center a fuel injector relative to the fuel injection system and to receive injected fuel for mixing with said compressed air from said swirler element, said sliding crossmember further comprising a flange mounted so as to slide on a sliding surface of the swirler element, the fixed part comprising antirotation means and the flange of the sliding crossmember comprising complementary antirotation means which interact with the antirotation means of the sliding crossmember to limit the rotation of the sliding crossmember relative to the fixed part, wherein the antirotation means of the sliding flange include at least one cutout formed in the flange and wherein the antirotation means of the fixed part include at least one lug protruding into said at least one cutout of the flange of the sliding crossmember,
   wherein said sliding crossmember is pivotable through a finite non-zero angle about said longitudinal axis of the fuel injection system until the lug butts against a wall of the cutout.

2. The injection system as claimed in claim 1, wherein one or more lugs protrude from the sliding surface of the fixed part.

3. The injection system as claimed in claim 1, wherein one or more lugs protrude from a retention ring which holds the sliding crossmember on the fixed part.

4. The injection system as claimed in claim 1, wherein the cutout is open.

5. The injection system as claimed in claim 1, wherein the cutout is closed.

6. The injection system as claimed in claim 1, wherein the flange of the sliding crossmember comprises a first cutout and a second cutout, the first cutout being relatively smaller than the second cutout so that the first cutout and a first lug protruding into said first cutout limit only the rotation of the sliding crossmember in a first operating step, a second lug protruding into the second cutout limiting the rotation of the sliding crossmember after the first lug protruding into the first cutout is worn.

7. The injection system as claimed in claim 1, wherein said flange of said sliding crossmember has a generally circular shape.

8. The injection system as claimed in claim 1, wherein said fixed part further comprises a bowl located downstream relative to a fuel flow through the fuel injection system such that a mixture of said compressed air and said fuel exits through said bowl.

9. The injection system as claimed in claim 8, wherein said swirler element is positioned between said flange and said bowl, said flange of said sliding crossmember being upstream of said swirler element.

10. The injection system as claimed in claim 9, wherein said sliding part does not have any portion extending through said swirler element.

11. The injection system as claimed in claim 9, wherein said sliding part does not have any portion extending downstream of said swirler element.

* * * * *